UNITED STATES PATENT OFFICE.

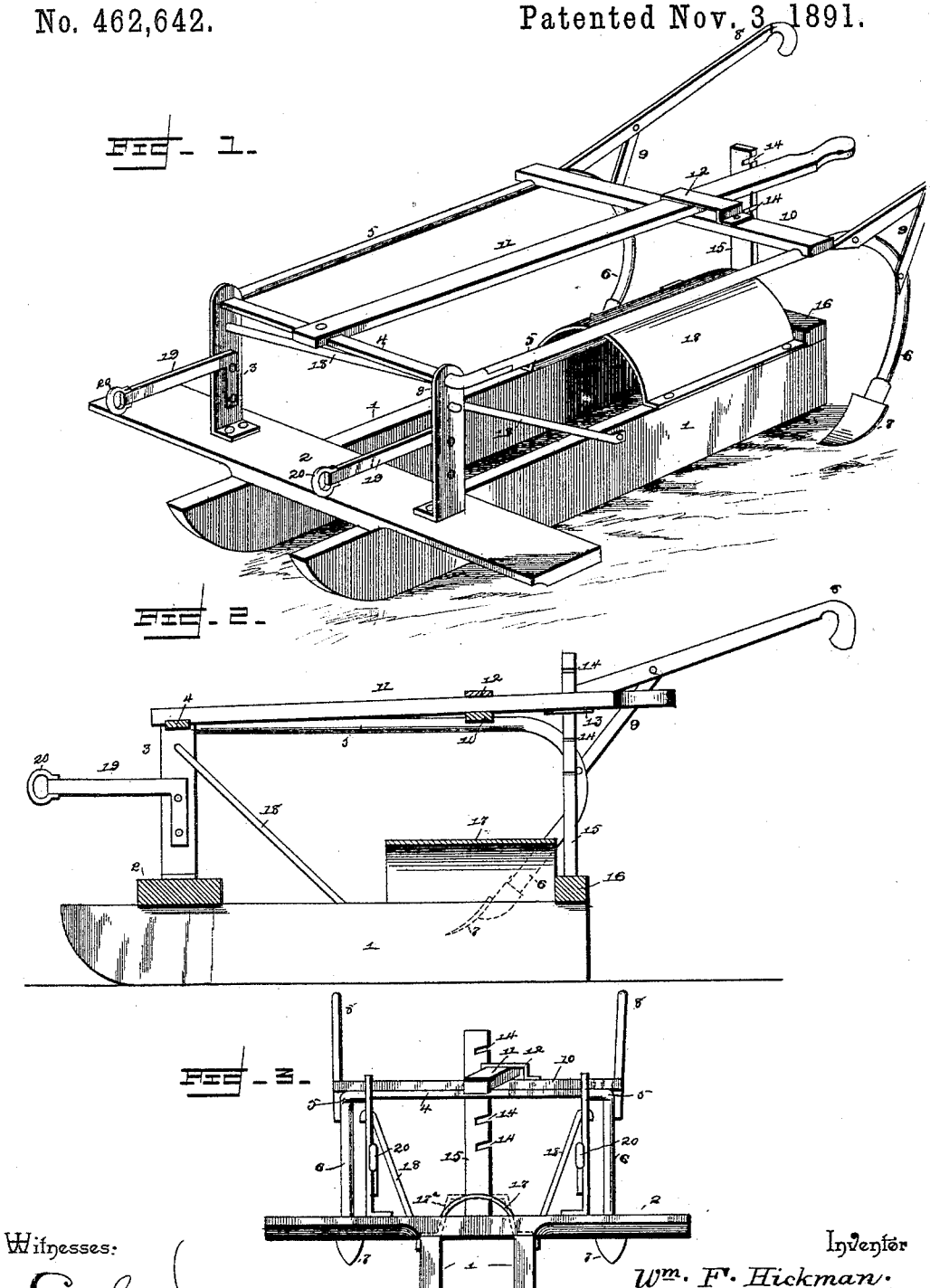

WILLIAM FREDERICK HICKMAN, OF CLEAR CREEK, KANSAS.

LISTED-CORN CULTIVATOR.

SPECIFICATION forming part of Letters Patent No. 462,642, dated November 3, 1891.

Application filed June 18, 1891. Serial No. 396,734. (No model.)

*To all whom it may concern:*

Be it known that I, WILLIAM FREDERICK HICKMAN, a citizen of the United States, residing at Clear Creek Township, in the county of Nemaha and State of Kansas, have invented a new and useful Listed-Corn Cultivator, of which the following is a specification.

This invention relates to devices for cultivating or plowing listed corn; and it has for its object to construct a machine of this class which shall be simple, convenient, and easily operated.

With these ends in view the invention consists in the improved construction, arrangement, and combination of parts, which will be hereinafter fully described, and particularly pointed out in the claim.

In the drawings hereto annexed, Figure 1 is a perspective view of a listed-corn cultivator constructed in accordance with my invention. Fig. 2 is a longitudinal sectional view. Fig. 3 is a front elevation.

Like numerals of reference indicate like parts in all the figures.

The frame of my improved cultivator is composed of runners 1 1, connected near their front ends by a cross-piece 2, which is secured to the upper edges of said runners and which extends beyond the sides of the latter. Upon the front piece 2 are mounted the uprights or brackets 3 3, the upper ends of which are provided with bearings for a shaft or bar 4, made, preferably, of flat iron, and to the ends of the same are bolted or otherwise attached beams 5 5, the rear ends of which are curved downwardly and forwardly to form the standards 6, carrying plow blades or shovels 7. Handles 8 are suitably attached to the beams 5 and connected with the latter by means of braces 9. The rear ends of the beams 5 5, which are spread slightly apart, are connected by a cross-piece 10. 11 designates a lever, which is suitably connected with the rock-shaft formed by the bar 4, which is journaled at the upper ends of the brackets 3, and said lever is confined in a staple 12 upon the upper side of the cross-bar 10. Said lever is provided with a laterally-extending catch 13, adapted to engage any one of a series of inclined notches 14, formed in an upright 15, mounted upon a cross-piece 16 at the rear ends of the runners.

A shield 17, which may be made of sheet metal, and which is preferably curved, as shown in the drawings, is mounted upon the upper edges of the runners at the rear ends of the latter, and braces 18 connect the said runners with the uprights or brackets 3, which are thus strengthened and sustained in proper position.

Draft-bars 19, having clevises 20 for the attachment of the draft, are connected independently with the uprights 3.

The operation of this invention will be readily understood. The machine is drawn by two horses, which walk in the furrows at the sides of the row of corn which is straddled by the machine. The front ends of the cultivator-beams, being connected at the upper ends of the uprights 3, are sufficiently high to clear any cornstalks, stubble, and other trash, and the blades or cultivator shovels will agitate the soil and destroy such stubble, &c., in the furrow without interfering with the young plants, which are protected by the runners of the machine and by the shield 17. The shovels may be raised and supported above the ground by means of the lever 11, the catch 13 of which may be placed into engagement with any one of the notches 14 of the upright 15.

The shield 17 may, if preferred, be made of wood, in which case it is not made curved, but is provided with inclined sides, as will be seen at 17ª in Fig. 3 of the drawings, where this construction has been shown in dotted lines.

Having thus described my invention, what I claim is—

In a listed-corn cultivator, the combination of the runners, a cross-bar connecting the same near the front ends, uprights mounted upon said cross-bar and connected with the runners by means of braces, a bar mounted in bearings at the upper ends of said uprights and having its ends extended rearwardly and downwardly to form the beams and standards, the shovels mounted upon the latter, a cross-bar connecting the beams, a lever connected with the rock-bar and extending through a staple upon the upper side of said cross-piece and having a laterally-extending catch, and an upright rising from a cross-piece at the rear ends of the runners and having inclined notches to be engaged by said catch, substantially as set forth.

In testimony that I claim the foregoing as my own I have hereto affixed my signature in presence of two witnesses.

WILLIAM FREDERICK HICKMAN.

Witnesses:
WM. HALL,
EHU HICKMAN.